United States Patent [19]

Roy

[11] 4,225,678
[45] Sep. 30, 1980

[54] FOAMED POLYURETHANE MATERIALS WITH A BITUMEN AND A HYDROXY FATTY OIL

[75] Inventor: Santanu Roy, Irvine, Calif.

[73] Assignee: George F. Thagard, Jr., Newport Beach, Calif.

[21] Appl. No.: 58,734

[22] Filed: Jul. 19, 1979

Related U.S. Application Data

[63] Continuation-in-part of Ser. No. 882,280, Mar. 1, 1978, abandoned.

[51] Int. Cl.³ .................... C08G 18/14; C08G 18/36
[52] U.S. Cl. .................... 521/101; 106/122; 106/273 N; 260/187 N; 521/173; 521/167; 521/117; 521/130
[58] Field of Search ............ 521/101, 167, 117, 130, 521/173; 106/122, 273 N; 260/18 TN

[56] References Cited

U.S. PATENT DOCUMENTS

| | | | |
|---|---|---|---|
| 2,955,091 | 10/1960 | Kane | 521/129 |
| 2,984,679 | 5/1961 | Ehrlich | 521/156 |
| 3,179,610 | 4/1965 | Wood | 260/18 TN |
| 3,412,050 | 11/1968 | Elkin et a. | 260/18 TN |
| 3,810,860 | 5/1974 | Doyle | 260/18 TN |
| 4,027,059 | 5/1977 | Koons | 528/75 |

*Primary Examiner*—H. S. Cockeram
*Attorney, Agent, or Firm*—Pennie & Edmonds

[57] ABSTRACT

A process for manufacturing a foamed polymeric material from starting materials which include a bitumen and a hydroxy fatty oil is disclosed. In addition to the process itself, certain final products of the process are claimed.

17 Claims, No Drawings

FOAMED POLYURETHANE MATERIALS WITH A BITUMEN AND A HYDROXY FATTY OIL

CROSS REFERENCE TO RELATED APPLICATION

This is a continuation-in-part of copending application Ser. No. 882,280, filed Mar. 1, 1978, now abandoned.

TECHNICAL FIELD

The present invention is broadly related to the field of polyurethane chemistry. More particularly, the invention relates to a process for manufacturing a foamed polymeric material from starting materials which include a bitumen such as an asphalt and a hydroxy fatty oil such as castor oil.

BACKGROUND ART

The term "polyurethane foam" is generally applied to foamed polymeric materials in which the polymer contains significant numbers of urethan groups, which have the characteristic structure

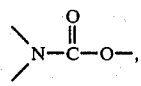

whether the urethan group repeats regularly throughout the macromolecule or not.

Polyurethane foams are ordinarily prepared by the reaction of a polyisocyanate compound with compounds having two or more "active hydrogens." Such active-hydrogen compounds include polyhydroxy compounds, generally termed polyols, and compounds containing amino groups or carboxyl groups. The active-hydrogen compound can contain functional groups in addition to groups which supply replaceable hydrogens. For example, hydroxyl-terminated polyethers and polyesters have been widely used to prepare polyurethane foams. Castor oil and other hydroxy fatty oils have also been used as active-hydrogen compounds in the production of polyurethane foams, particularly rigid and semirigid foams. Suitable catalysts are often included in the reaction mixture in order to speed the polymerization reaction, although the addition of a catalyst is not required in all applications. Gas for producing the foam is usually generated at least in part by adding water to the reactants. The water reacts with the polyisocyanate to produce carbon dioxide for foaming. In addition, blowing agents such as low-boiling halocarbons can be mixed with the reactants to produce gas for foaming. Surfactants and other additives are frequently included in the reaction mixture to regulate the size of the foam cells and otherwise influence the properties of the resulting foam.

Within the polyurethane foam family, it is possible to obtain a wide range of physical and chemical properties of the foam by appropriate selection of the specific raw materials and the reaction conditions. A detailed discussion of prior-art polyurethane compositions may be found in Kirk-Othmer, *Encyclopedia of Chemical Technology*, 2nd ed., (Interscience, 1970), vol. 21, pp. 56–106.

Attempts have been made to incorporate asphalts and tars into polyurethane compositions by one means or another in order to reduce the costs of the starting materials and to produce a polyurethane material having properties suited for a particular application.

One such attempt is disclosed in U.S. Pat. No. 3,179,610. The '610 patent discloses compositions obtained by blending certain polyurethane-type prepolymers with a bituminous composition such as asphalt or tar. The polyurethane prepolymers are prepared by reacting a molar excess of a polyisocyanate with a compound containing a plurality of hydroxy or carboxy groups which are reactive with isocyanate groups. Castor oil is given as an example of such a compound. By using a molar excess of the polyisocyanate when preparing the polyurethane prepolymer, unreacted isocyanate groups are present for further reaction or curing. The prepolymer thus prepared is blended with a bituminous material at room temperature or an elevated temperature, the weight of the prepolymer being from 5 percent to 25 percent of the total weight of the blend. The resulting blend can be foamed and cured in situ by adding water in amounts to react with the prepolymer, liberating carbon dioxide. The '610 patent discloses using the foamed compositions as a joint filler and sealer. All of the applications for the compositions disclosed in the '610 patent involve bonding the composition to another material in some way.

U.S. Pat. No. 3,810,860 discloses a process for polymerizing crude petroleum hydrocarbons which involves a two-component system. The first component includes a crude petroleum hydrocarbon and an arylene diisocyanate miscible with the hydrocarbon, and the second component includes a crude petroleum hydrocarbon, a hydrogen donor miscible with the hydrocarbon, and organic acid miscible with the hydrocarbon. Among the hydrogen donors disclosed in the '860 patent are mixtures of a tertiary amine and castor oil. According to the '860 patent, highly asphaltic crude petroleum hydrocarbons are generally not compatible in the second component, the component which would include castor oil were it to be incorporated in the hydrogen donor.

I have invented a process for manufacturing a foamed polymeric material and products related thereto which possess constellations of useful properties not found heretofore in the art.

DISCLOSURE OF INVENTION

The present invention relates to a process for manufacturing a polymeric foam which comprises the step of preparing an intermediate reactant by heating a mixture of a bitumen and a hydroxy fatty oil to a temperature substantially above room temperature and maintaining the mixture at such a temperature for a time sufficient to enable significant fractions of the bitumen and the hydroxy fatty oil to react. As used herein, the term "bitumen" refers to mixtures of hydrocarbons of natural or pyrogenous origin; or combinations of both; which may be accompanied by their nonmetallic derivatives; which may be gaseous, liquid, semisolid, or solid; and which are completely soluble in carbon disulfide. This definition is based on the one adopted by the American Society for Testing and Materials in "Terms Relating to Materials for Roads and Pavements," ASTM Designation D 8-55 (Philadelphia, 1955). In preferred embodiments of the present invention, the bitumen employed is solid or semisolid at room temperature, although at higher temperatures it may exist in a liquid or gaseoud state. A preferred hydroxy fatty oil is castor oil.

The process further comprises the step of combining the intermediate reactant of the preceding paragraph with a polyhydroxy compound, a polyisocyanate, and a gas-generating agent to form a polymeric foam. The gas-generating agent is ordinarily water and a blowing agent. Preferred polyhydroxy compounds and polyisocyanates are discussed below. A particularly useful blowing agent includes a combination of dibutylphthalate and ethanol.

The present invention also relates to products made by the process described above, as well as to the intermediate reaction product between a bitumen and a hydroxy fatty oil and to the dibutylphthalate-ethanol blowing agent.

Because one of the starting materials is a bitumen, the foamed polymer of the present invention can be produced relatively inexpensively as compared with conventional polyurethane foams.

The polymeric foam of the present invention can be used in many of the conventional applications for thermosetting polyurethane foams. For example, it can be readily cast in a mold or applied as a coating to a surface. However, it also has properties which make it particularly well suited for certain applications for which conventional foamed polymers are less well suited or cannot be used at all.

Preferred foamed polymeric products of the present invention cure to materials which are strong and tough. As a consequence, the polymeric materials can be used to fabricate articles which structurally must be capable of bearing heavy loads. For example, pallets for use in warehousing and shipping can be made from a preferred foamed polymeric material of the present invention. The pallets are light, but strong enough to be hoisted about fully loaded with a fork-lift truck under typical warehousing conditions.

One feature of preferred foamed polymeric materials of the present invention is that, even after they are fully cured, they are soluble in molton asphalt. Thus shipping pallets for roofing tar made from such materials can be conveniently disposed of at a job site by breaking up the pallets and casting them into the molten asphalt in the asphalt kettles.

The foamed product of the present invention is an excellent thermal insulator. Moreover, the material is relatively impermeable to water vapor and other gases as compared to typical polyurethane foams and thus can be used to advantage as a thermal insulating material for refrigerators and the like where water condensation within an insulator can be a problem.

Certain formulations of the foamed material of the present invention are relatively inert with respect to water as compared to typical polyurethane foams and thus resist weathering. Such foams can be used to particular advantage as construction materials in the marine industry; for example, as insulation or flotation material on board ships.

Conventional polyurethane foams tend to be highly flammable and consequently expensive fire-retardant additives must often be incorporated in such foams. Foamed polymeric materials of the present invention, on the other hand, can be formulated so that the need for a fire-retardant additive is greatly reduced or even eliminated altogether for certain applications. Foamed materials of the present invention having a density in excess of about eight lb/ft$^3$ tend to have relatively low flammabilities.

Preferred foamed polymeric materials of the present invention are generally odor free and are resistant to attack by mildew, mold, fungus, and the like.

The products of the present invention are ordinarily black in color and are good absorbers of solar radiation. It is anticipated, for example, that the material will find wide use as an absorbent backing for solar-powered water heaters.

Panels for use in constructing buildings can be fabricated by foaming a polymeric material of the present invention between two sheets of fiber-glass reinforced resin or the like. The resulting sandwich-like panels are light and strong and can be used, for example, as wall boards or roofing panels in the construction of houses. Inexpensive pallets for shipping and warehousing can be made with the foamed polymeric material reinforced with tar paper. It will be apparent to those skilled in the art that foamed polymeric products of the present invention can be used to make other reinforced articles and materials.

BEST MODE FOR CARRYING OUT THE INVENTION

An intermediate product can be manufactured by heating a mixture of a bitumen such as an asphalt and a hydroxy fatty oil such as castor oil to a reaction temperature substantially above room temperature, thereby inducing a thermal reaction between the two components. For typical asphalts and castor oil, the temperature range will ordinarily be between about 140° C. and about 200° C., the preferred range being between about 145° C. and about 155° C., although reaction temperatures outside of these ranges may be preferred for other starting materials. It will generally be preferred to employ from about 20 to about 100 parts by weight of the hydroxy fatty oil for each 100 parts by weight of the bitumen. The mixture of hydroxy fatty oil and bitumen is maintained at the reaction temperature for a time, typically an hour or more, sufficient to enable significant fractions of the bitumen and the hydroxy fatty oil to react.

If the reaction between the hydroxy fatty oil and the bitumen is carried out under an atmosphere of pressurized air, the resulting intermediate product generally tends to require less polyisocyanate to produce acceptable foamed polymeric materials. For example, if the reaction between a typical asphalt and castor oil is carried out under an atmosphere of air at a pressure of from about 5 psi to about 10 psi above standard atmospheric pressure, the quantity of polyisocyanate can be reduced by up to roughly 40 percent. Exposure to an atmosphere of pressurized air can also be carried out at a later stage in the process to similar beneficial effect, for example, after the intermediate product is mixed with a polyhydroxy compound. The effect of such treatments with pressurized air is most pronounced when a non-blown bitumen is used as a starting material.

The intermediate product thus obtained is combined with other ingredients to produce the desired foam product. Such ingredients include a polyhydroxy compound, a polyisocyanate and a gas-generating agent such as water and a blowing agent. Additional ingredients such as catalysts, surfactants and plasticizers can be included if desired.

Virtually all of the polyhydroxy compounds employed in conventional polyurethane foam formulations and mixtures thereof, including both polyester polyols and polyether polyols, can be employed as the polyhydroxy compound referred to in the preceding paragraph. Representative polyether polyols include poly(oxypropylene) glycols, poly (oxypropylene-b-oxyethylene) glycols (block copolymers), poly (oxypropylene) adducts of glycerol, poly (oxypropylene) adducts of trimethylolpropane, poly (oxypropylene-b-oxyethylene) adduct of trimethylolpropane, poly (oxypropylene) adducts of 1,2,6-hexanetriol, poly (oxypropylene) adducts of pentaerythritol, poly (oxypropylene-b-oxyethylene) adducts of ethylenediamine (block copolymers), and poly (oxypropylene) adducts of sucrose, methylglucoside, sorbitol. Representative polyester polyols include those prepared from the following monomers: adipic acid, phthalic anhydride, ethylene glycol, propylene glycol, 1,3-butylene glycol, 1,4-butylene glycol, diethylene glycol, 1,2,6-hexanetriol, trimethylolpropane and 1,1,1-trimethylolethane. Generally it will be preferred that the polyhydroxy compounds have average molecular weights as calculated from their hydroxyl numbers in the range of from about 300 to about 9,000, with molecular weights in excess of about 400 being particularly preferred. As specific examples, poly (oxypropylene) polyols having hydroxyl numbers in the range of from about 350 to about 800 are suitable for certain preferred formulations of the foamed polymeric material of the present invention. Another polyhydroxy compound: N,N,N',N'—tetrakis (2-hydroxypropyl)—ethylenediamine, which is commercially available under the trade name of "Quadrol" from BASF Wyandotte Corporation, is suitable for a number of preferred formulations, as are "Niax Pentol," which is commercially available from the Union Carbide Corporation, and "Voranol," which is commercially available from Dow Chemical Company.

Suitable polyisocyanates include virtually all of the polyisocyanates employed in conventional polyurethane foam formulations, including aromatic, aliphatic and cycloaliphatic polyisocyanates. A representative list of such polyisocyanates includes: 2,4-tolylene diisocyanate, (65:35) tolylene diisocyanate, (80:20) tolylene diisocyanate, 4,4'-diphenylmethane diisocyanate, dianisidine diisocyanate, tolidine diisocyanate, hexamethylene diisocyanate, m-xylylene diisocyanate, phenyl isocyanate, p-chlorophenyl isocyanate, o-chlorophenyl isocyanate, m-chlorophenyl isocyanate, 3,4-dichlorophenyl isocyanate, 2,5-dichlorophenyl isocyanate, methyl isocyanate, ethyl isocyanate, n-butyl isocyanate, n-propyl isocyanate and octadecyl isocyanate. For many applications it will be preferable for reasons of economy to employ crude mixtures of polyisocyanates. For specific examples, polymethylene polyphenylisocyanates available commercially under the trade names "PAPI" and "Mondur MR" from the Upjohn Company and the Mobay Chemical Company, respectively, are suitable for a number of preferred formulations of the present invention.

Although gas-generating agents which do not include water can be found which produce acceptable foamed polymeric materials according to the present invention, such agents are invariably more expensive than corresponding gas-generating agents which include water. For this reason, it is preferred for the gas-generating agent to include water. Conventional blowing agents for polyurethane foam can be used to advantage in preparing the foamed polymeric materials of the present invention. Although it is not necessary in every case to use a blowing agent in addition to water, the use of water alone as a gas-generating agent tends to produce a material which is friable, which is undesirable for some applications. For certain applications, friability is not a serious drawback. Examples of conventional blowing agents are the low-boiling liquids trichlorofluoromethane, dichlorodifluoromethane and dichloromethane (methylene chloride).

A novel blowing agent particularly suited for manufacturing the foamed polymeric materials of the present invention, as well as conventional polyurethane foams, comprises the combination of ethanol and dibutylphthalate. To prepare preferred formulations of the blowing agent, quantities of ethanol and dibutylphthalate are mixed together such that the molar ratio of ethanol to dibutylphthalate is in the range of from about 1.5 to about 4. The blowing agent not only can provide gas for generating foam when mixed with reactants for a foamed polymerization reaction, but can obviate the need for a surfactant to be included in the reaction mix. Even when no additional surfactant is included, foam produced using the ethanol-dibutylphthalate blowing agent of the present invention tends to have a substantially uniform density and be made of bubbles of substantially uniform diameter. The blowing agent can be handled safely since it has a low toxicity.

Although in general the foaming step of the process of the present invention need not be catalyzed, it is ordinarily preferable to do so. A catalyst which can be used successfully to catalyze a reaction among a particular polyhydroxy compound, a particular polyisocyanate and a gas-generating agent in a conventional process to manufacture polyurethane foam generally can also be used in the process of the present invention involving the same polyhydroxy compound, polyisocyanate, and gas-generating agent. Such catalysts are widely known in the art. Representative examples of such catalysts and polyurethane-foam formulations in which they can be used are set forth in pages 69–75 of Vol. 21 of the Kirk-Othmer *Encyclopedia* cited above. As specific examples, dimethylethanolamine and triethylamine can be used in certain preferred formulations.

In some cases it may be desirable to adjust the pH of the bitumen-hydroxy fatty oil intermediate product in order to control the rate of subsequent reactions in which the intermediate product takes part. The bitumen-hydroxy fatty oil intermediate product is typically acidic and can be neutralized with sodium hydroxide or other alkaline substance if desired.

For many applications it is advantageous to include a surfactant among the ingredients used to prepare the foamed polymeric material of the present invention, particularly when bulky castings are to be formed. Conventional silicone surfactants used in manufacturing polyurethane foams generally function satisfactorily in the process of the present invention. As specific examples of preferred surfactants, the silicone surfactants commercially available from the Dow Corning Corporation under the trade names "Dow-Corning 193," "Dow Corning 194," and "Dow Corning 197" are cited. As explained above, if the ethanol-dibutylphthalate blowing agent of the present invention is used, the need for surfactant is obviated.

It may also be advantageous to include a plasticizer among the ingredients of the process of the present invention. Preferred plasticizers include dioctylphthalate, diisooctylphthalate, dibutylphthalate, diisobutylphthalate, dicaprylphthalate, diisodecylphthalate, tricresylphosphate, trioctylphosphate, diisooctyladipate and diisodecyladipate.

The process of the present invention can generally be carried out in the following preferred manner, although it will be readily apparent to those skilled in the art that other sequences of steps can be used. The intermediate product is first prepared from a bitumen and a hydroxy fatty oil according to the procedure described above in an enclosed heated tank. In order to reduce air-pollution problems, the tank is preferably connected to a water-cooled condenser to reflux and collect condensible vapors driven off from the reactants during the heating. The intermediate product is then cooled. At the temperature to which it is cooled, the intermediate product should be sufficiently fluid to permit mixing with other ingredients. The polyhydroxy compound and any catalysts, surfactants and plasticizers are then thoroughly mixed with the intermediate product. Generally from about 70 parts to about 200 parts by weight of polyhydroxy compound are employed for every 100 parts by weight of the bitumen-hydroxy fatty oil intermediate product. The resulting mixture is then combined with the polyisocyanate, blowing agent and water in a conventional mixing head for polyurethane foam. Generally a molar ratio of polyisocyanate to polyhydroxy compound in a range of from about 1:1 to about 11:1 is preferred. From about 0.5 to about 1.75 percent by weight of water based on the weight of the polyhydroxy compound is generally preferred. The density of the resulting foamed product is determined to a large degree by the quantities of water and blowing agent used. A temperature in the range of from about 30° C. to about 85° C. is preferred for carrying out the final mixing.

EXAMPLES

The following examples illustrate particular preferred embodiments of the present invention.

EXAMPLE 1

Approximately 1000 g of non-blown asphalt is placed in a stainless-steel reactor and melted by heating it to about 150° C. for about one hour. Approximately 300 g of castor oil is added to the molten asphalt and the resulting mixture is maintained at about 150° C. with stirring for about an hour to form an intermediate product. The intermediate product is allowed to cool to about 50° C. and the following ingredients are added to it:

"LS 490" poly (oxypropylene) polyol—about 105 g,
"Dow-Corning 197" silicone surfactant—about 8 g,
dimethylethanolamine—about 3.6 g, and triethylamine—about 2.0 g.

The poly (oxypropylene) polyol "LS 490" is a commercially available polyether polyol from Union Carbide Corporation and is believed to be a reaction product of sucrose and propylene oxide catalyzed by potassium hydroxide. This polyhydroxy compound has a hydroxyl number in the range of from about 350 to about 800. The resulting mixture is metered to a mixing head where it is combined with water, trichlorofluoromethane blowing agent and the polymethylene polyphenylisocyanate "PAPI." The four ingredients are combined proportionally in the mixing head so that totals of approximately 4.15 g of water, approximately 114 g of trichlorofluoromethane and approximately 955 g of the polyisocyanate "PAPI" are mixed with the quantities of the other ingredients listed above. The stream of reaction mixture is discharged from the mixing head into a mold where the foaming reaction occurs. The temperature of the reaction mixture exiting the mixing head is about 50° C. The reaction mixture is allowed to foam and cure in the mold, where it forms a tough, strong polymeric material.

EXAMPLE 2

A blowing agent is prepared by combining approximately 28.7 g of ethanol and approximately 57.7 g of dibutylphthalate. The resulting blowing agent is used in place of the trichlorofluoromethane and the silicone surfactant of Example 1. The resulting approximately 86.4 g of ethanol-dibutylphthalate blowing agent is metered into the mixing head where it is mixed proportionally with the other ingredients in the quantities given in Example 1. A foamed polymeric material is produced which cures to a strong, tough product.

EXAMPLE 3

The steps of Example 1 are repeated, except that for about one-half of the time that the mixture of asphalt and castor oil is maintained at about 150° C., the mixture is maintained under an atmosphere of air pressurized to about 10 psi above standard atmospheric pressure. Only about 455 g of the polyisocyanate "PAPI" is required to produce a foamed polymeric material of a quality similar to that produced in Example 1.

EXAMPLE 4

A surface coated with a foamed polymeric material of the present invention for insulation and the like can be prepared as follows. Approximately 1000 g of non-blown asphalt, approximately 400 g of castor oil, and approximately 200 g of N,N,N',N'-tetrakis (2-hydroxypropyl)-ethylenediamine ("Quadrol") are mixed together and maintained at about 150° C. with stirring in a stainless steel container for about one and a half hours to form an intermediate product. The intermediate product is then cooled to about 50° C. A mixture of the following ingredients is prepared at room temperature in a second vessel:

"Quadrol"—approximately 250 g,
dimethylethanolamine—approximately 4.2 g,
"Dow Corning 197" silicone surfactant-approximately 17 g,
trichlorofluoromethane—approximately 255 g, and
water—approximately 8.5 g.

A third vessel contains approximately 952 g of the p,p'-dephenyl methanediioscyanate "Mondur MR." The contents of the three containers are proportionally metered into a mixing head equipped with a spray-discharge nozzle. The temperature of the ingredients is adjusted so that the reaction mixture discharged from the mixing head has a temperature of about 75° C. The reaction mixture from the mixing head is sprayed from the nozzle onto a surface to be coated, which is also maintained at about 75° C. The reaction mixture foams and cures on the surface, forming a coating of foamed polymeric material.

EXAMPLE 5

A high-density foamed polymeric material particularly adapted for use as a flotation material in the marine industry is prepared as follows. An intermediate product is prepared by heating a mixture of approximately 1000 g of asphalt and approximately 333 g of castor oil for about one hour at about 150° C. The resulting intermediate product is cooled to about 50° C. A mixture of approximately 333 g of the poly (oxypropylene) polyol "LS 490," approximately 3.3 g of dimethylethanolamine, approximately 13.2 g of triethylamine, approximately 233 g of trichlorofluoromethane and approximately 999 g of castor oil is prepared at room temperature. Approximately 1332 g of asphalt and approximately 1864 g of the polyisocyanate "PAPI" are mixed together and heated to about 150° C. and then cooled to about 50° C. All three components are then metered to a mixing head where they are combined proportionally. Upon being discharged from the mixing head the stream of reaction mixture has a temperature in the range of from about 30° C. to about 90° C. The reaction mixture is deposited in a suitable cavity which it is desired to be filled with foamed material. The temperature of the walls of the cavity are about 50° C. The reaction mixture foams "in place," filling the cavity with a foamed polymeric material having a density of about 4 lb./ft.$^3$ This product is highly water resistant.

EXAMPLE 6

Approximately 1000 g of asphalt is placed in an enclosed stainless steel reactor vessel and melted by heating it to about 175° C. The temperature of the reactor vessel is maintained at about 175° C. throughout the following steps. After the asphalt melts about 250 g of castor oil is mixed with the asphalt and allowed to react for about one hour to form an intermediate product. Then about 250 g of the poly (oxypropylene) polyol "LS 490" is mixed with the intermediate product and allowed to react for about one hour. About 50 g of water is mixed with about 50 g of "Dow Corning 191" silicone surfactant and a catalyst made up of about 25 g each of triethylamine and triethanolamine. This four-component mixture is pumped into the reactor vessel where it is mixed with the contents and allowed to react at about 175° C. for about one hour. Saturated steam is injected into the reactor vessel to form a steam atmosphere over the reaction mixture. The pressure of the steam atmosphere is maintained at about 30 psi above standard atmospheric pressure at the temperature of about 175° C. for about one hour. Roughly 200 g of steam is required. The resulting reaction mixture is pumped without substantial cooling to a mixing head also maintained at about 175° C. where it is proportionally mixed with 1070 g of the polyisocyanate "PAPI-901." The steam incorporated in the asphaltic reaction mixture serves as a blowing agent so that no additional blowing agent need be supplied to the mixing head. The mixture exiting the mixing head is deposited in a mold where it is allowed to foam and cure. An excellent foamed polymeric material is produced.

It is not intended to limit the present invention to the specific embodiments described above. For example, either blown or non-blown asphalt can be used. The foaming reactions can be either catalyzed or uncatalyzed. It is recognized that these and other changes may be made in the compositions and processes specifically described herein without departing from the scope and teachings of the instant invention, and it is intended to encompass all other embodiments, alternatives and modifications consistent with the present invention.

I claim:

1. A process for manufacturing a polymeric foam comprising the step of combining the following ingredients:
   (a) an intermediate reactant prepared by heating a mixture of a bitumen and a hydroxy fatty oil to a temperature substantially above room temperature and maintaining the mixture at such a temperature for a time sufficient to enable significant fractions of the bitumen and the hydroxy fatty oil to react;
   (b) a polyhydroxy compound;
   (c) a polyisocyanate; and
   (d) a gas-generating agent
   to form a polymeric foam.

2. The process according to claim 1, in which the gas-generating agent includes water and a blowing agent.

3. The process according to claim 2, in which the hydroxy fatty oil is castor oil.

4. The process according to claim 3, in which the bitumen is an asphalt.

5. The process according to claim 4, in which the polyhydroxy compound is a polyether polyol having a hydroxyl number in the range of from about 350 to about 800.

6. The process according to claim 5, in which the polyether polyol is a poly (oxypropylene) polyol.

7. The process according to claim 4, in which the polyhydroxy compound is N,N,N',N'-tetrakis (2-hydroxypropyl)-ethylenediamine.

8. The process according to claim 2, in which the blowing agent includes a mixture of dibutylphthalate and ethanol.

9. The process according to claim 1 in which the gas-generating agent is steam.

10. The process according to claim 9 in which the intermediate reactant and the polyhydroxy compound are mixed together and maintained under an atmosphere of pressurized steam prior to being combined with the polyisocyanate.

11. The polymeric foam produced according to the process of claim 1.

12. The polymeric foam produced according to the process of claim 4.

13. A process for manufacturing a polymeric foam comprising the step of combining the following ingredients:
   (a) an intermediate reactant prepared by heating a mixture comprising a bitumen and a hydroxy fatty oil to a temperature substantially above room temperature and maintaining the mixture at such a temperature for a time sufficient to enable significant fractions of the bitumen and the hydroxy fatty oil to react;
   (b) a polyhydroxy compound;
   (c) a polyisocyanate; and
   (d) a gas-generating agent
   to form a polymeric foam.

14. The process according to claim 13, in which the bitumen is an asphalt and the hydroxy fatty oil is castor oil.

15. The process according to claim 14 in which the mixture from which the intermediate reactant is prepared further includes a polyhydroxy compound.

16. The process according to claim 14 in which the mixture from which the intermediate reactant is prepared consists of asphalt and castor oil.

17. The polymeric foam produced according to the process of claim 13.

* * * * *

UNITED STATES PATENT AND TRADEMARK OFFICE
CERTIFICATE OF CORRECTION

PATENT NO. : 4,225,678

DATED : September 30, 1980

INVENTOR(S) : Santanu Roy

It is certified that error appears in the above—identified patent and that said Letters Patent are hereby corrected as shown below:

First Page - See: References Cited, "Elkin et a." should read -- Elkin et al. --.

Column 2, line 67, "gaseoud" should read -- gaseous --.

Column 3, line 39, "molton" should read -- molten --.

Column 5, line 3, "-b-" should read -- -$b$- --.

Column 5, line 6, "-b-" should read -- -$b$- --.

Column 5, line 9, "-b-" should read -- -$b$- --.

Column 5, line 43, "m-xylylene" should read -- $m$-xylylene --.

Column 5, line 44, "p-chlorophenyl" should read -- $p$-chlorophenyl --.

Column 5, line 44, "o-" should read -- $o$- --.

UNITED STATES PATENT AND TRADEMARK OFFICE
CERTIFICATE OF CORRECTION

PATENT NO. : 4,225,678

DATED : September 30, 1980

INVENTOR(S) : Santanu Roy

It is certified that error appears in the above-identified patent and that said Letters Patent are hereby corrected as shown below:

Column 5, line 45, "m-chlorophenyl" should read -- *m*-chlorophenyl --.

Column 5, line 47, "n-butyl" should read -- *n*-butyl --.

Column 5, line 48, "n-propyl" should read -- *n*-propyl --.

Signed and Sealed this

Sixth Day of January 1981

[SEAL]

Attest:

Attesting Officer

SIDNEY A. DIAMOND

*Commissioner of Patents and Trademarks*